Oct. 3, 1933.   L. DILLON ET AL   1,928,971
WELL SURVEY INSTRUMENT
Filed Oct. 15, 1930   2 Sheets-Sheet 1
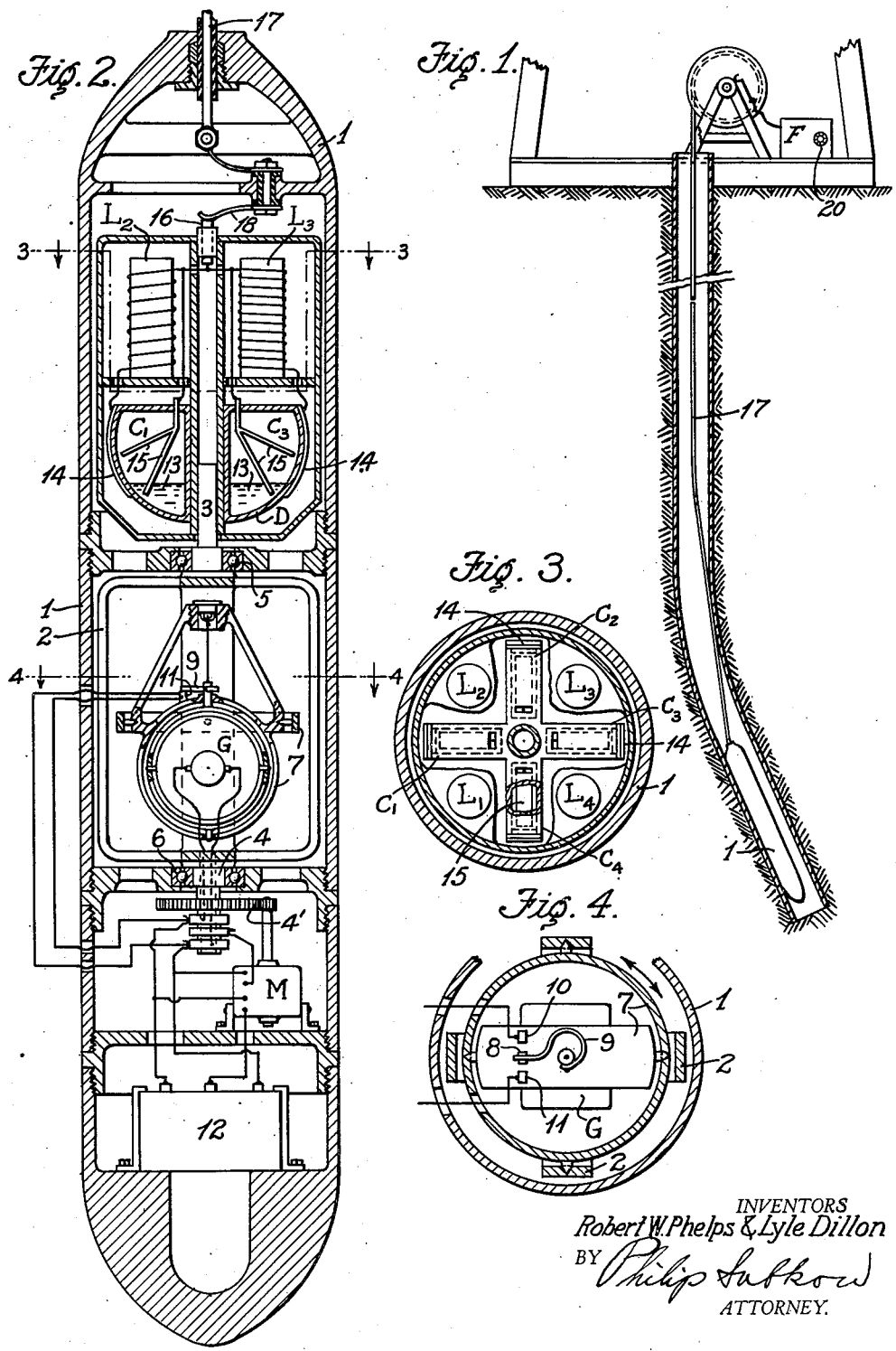
INVENTORS
Robert W. Phelps & Lyle Dillon
BY Philip Subkow
ATTORNEY.

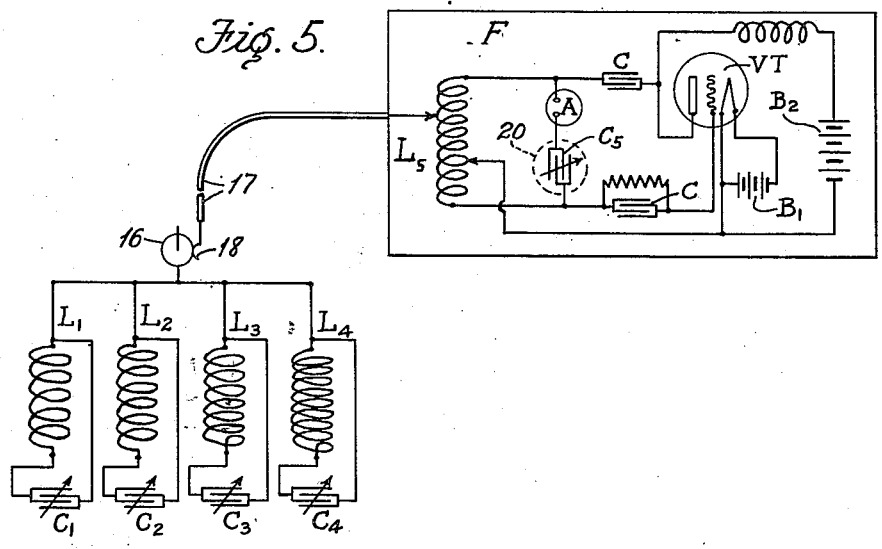
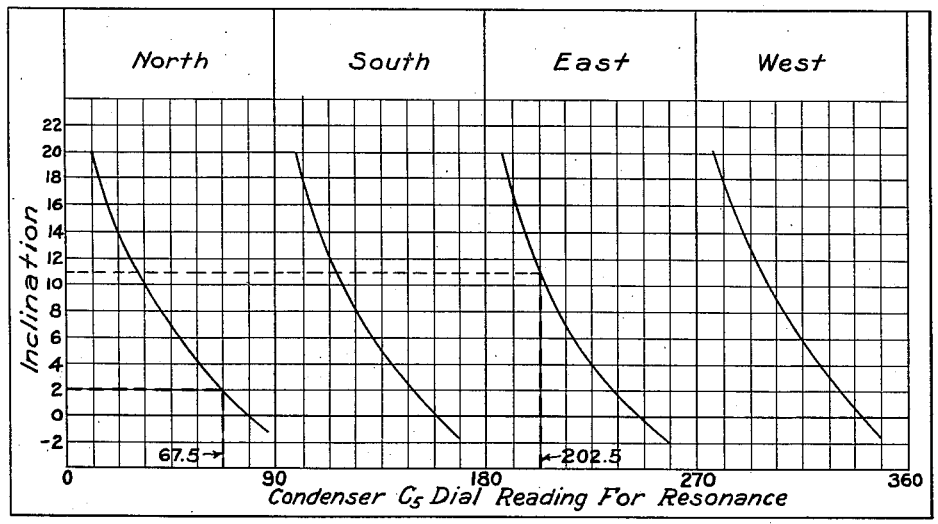

Patented Oct. 3, 1933

1,928,971

UNITED STATES PATENT OFFICE 1,928,971

WELL SURVEY INSTRUMENT

Lyle Dillon, Los Angeles, and Robert W. Phelps, Brea, Calif., assignors to Union Oil Company of California, Los Angeles, Calif., a corporation of California Application October 15, 1930. Serial No. 488,867

21 Claims. (Cl. 177—351)

This invention relates to devices for surveying bore holes, particularly deep wells, in order to determine the degree of inclination and the direction of inclination of the hole at various points.

The primary object of the invention is to furnish a survey instrument of the stated character which will be adapted for taking the desired readings at the surface of the well at any moment, whereby to facilitate the survey of the hole through the medium of records for as many successive depths as may be required, and to accomplish the taking of such readings rapidly so that the actual time consumed in the taking of the readings at any given depth may be reduced to a few seconds and substantially the only time required for the entire survey will be that consumed in lowering said instrument step by step to the bottom of the hole, and for withdrawal.

Another object is to provide a device of comparative simplicity and cheapness and one whose readings will be accurate to the extent of only a very slight error if any.

We have discovered that we can employ a plurality of oscillatory circuits having definitely separated frequency ranges, and that by arranging these circuits radially about the axis of an instrument adapted to be lowered into a well hole and spacing them uniformly, for example, at intervals of 90°, we can rely upon variations of the points of resonance of the circuits to indicate corresponding inclinations of the longitudinal axis of the instrument. The variations in the point of resonance of each circuit may be accomplished for example by a variable condenser including a gravity operated member, such as a mercury body. In a specific form each circuit contains an inductance and a shunted variable capacity, each capacity being a mercury condenser where the dielectric is a narrow mercury-containing jar having a metal coating on its outermost face only, so that the capacity of the condenser varies as the jar is tipped and causes the mercury level to rise or fall with respect to the outer metal coating. When a high frequency alternating current is passed to said circuits and the capacity of a variable condenser at the surface is adjusted to each circuit, as by rotation of a dial, there will be a sudden absorption of energy by the respective resonant circuit as its point of resonance is thus passed, which absorption may be indicated by an ammeter and which dial position for said absorption will also be indicated by the dial reading. This reading for each circuit may be taken as indicative of the capacity of the circuit and therefore of the degree of inclination. Two such readings will give the two components of inclination and the actual inclination may be mathematically determined. At the same time the angle of the direction of inclination in the quadrant defined by the two circuits may be mathematically determined. By providing means, such as a gyroscopic compass, for maintaining orientation of the instrument, for example in the true north, the actual direction of the inclination and the degree of inclination will be shown by the two mathematical computations.

Our invention, therefore, stated in its broadest aspect, may be said to reside both in a method and apparatus wherein a plurality of devices such as certain types of condensers are employed for the purpose of yielding factors which are indicative of the degree of inclination of the instrument in any given position and of the direction of inclination at such position. The invention may be otherwise stated as residing in a method and apparatus wherein means at the surface for generating an electric wave is employed in combination with an instrument adapted to be lowered into a well bore and comprising means to deform the wave in accordance with inclination at a given depth and means to further deform said wave for determination of the direction of inclination at said depth. The invention also includes the use of gravity operated condensers such as modified types of Leyden jars wherein fluid conductors such as mercury are employed as the inner element. The invention resides especially in these features as employed in an instrument wherein an orienting device such as a gyroscopic compass is used to maintain the directional position of the instrument itself.

In the accompanying drawings wherein one embodiment of the invention is disclosed by way of illustration:

Fig. 1 is a vertical section of a bore hole showing the apparatus with the well instrument suspended in position to take readings;

Fig. 2 is a sectional elevation of the instrument which is lowered into the bore hole;

Fig. 3 is a section through the instrument taken approximately on line 3—3 of Fig. 2, parts being broken away;

Fig. 4 is a cross-section taken approximately on line 4—4 of Fig. 2;

Fig. 5 is a wiring diagram for the angle measuring element and detector;

Fig. 6 is a set of curves for calibrating dial readings of an adjustable condenser in the surface mechanism against instrument inclination; and Fig. 7 represents the electric current or wave as recorded on a moving chart by any suitable electric recorder.

The well instrument includes a case 1 having mounted therein a frame 2 which is supported by shafts 3 and 4 in bearings 5 and 6 co-axial with said case. Frame 2 carries a ballistic gyroscopic compass G similar in construction and operation to that used on board ship to continually indicate true geographical north. Briefly the compass consists of a rapidly rotating wheel mounted in gimbals 7 so that it has three degrees of freedom of rotation in space. The rotation of the earth unbalances the compass in such a way that the rotating wheel's axis is forced to assume a position parallel to the earth's axis (precession), thus pointing to the geographical north, and tending to remain fixed in that position. If during the operations of lowering the instrument into the hole, casing 1 is rotated about its axis, gimbals 7 will be carried around with it causing relative rotation between said gyroscope G and gimbals 7.

A contact point 8 is attached to the vertical axis of the gyroscope by arm 9, and contact points 10 and 11 are mounted on to the gimbals at opposite sides of contact 8, so that any rotation of the instrument case will cause element 8 to contact with points 8, 10 or 11 depending on the direction of movement. A reversible motor M energized by batteries 12 is controlled by said contacts, 8, 10 and 11 so that the motor will impart rotary motion through a gear train 4' and shaft 4 to frame 2 thus restoring it to its original position with respect to geographical north.

The upper portion of the instrument contains the unit which is sensitive to vertical angular deviation. This unit, which is supported on and oriented by shaft 3 of frame 2, consists of four electrical oscillatory circuits. These circuits are composed of inductances $L_1$, $L_2$, $L_3$, $L_4$ respectively and shunted variable capacities $C_1$, $C_2$, $C_3$, $C_4$ respectively, these inductances and capacities having values such that the frequency range of each oscillatory circuit is definitely separated from that of each other circuit. The variable capacities are composed of thin dielectric material D and are in the form of narrow hollow jars or segments, disposed parallel with the axis of the instrument. Each jar is partially filled with mercury 13, and is coated externally of its outermost side with a metal conductor 14 extending to a point slightly below the surface level of said mercury. Electrical contact is maintained with mercury 13 by means of metal fingers 15. Said four variable capacities are placed radially about the shaft 3 as a center at angular intervals of 90°. Each capacity may be considered as a modified Leyden jar wherein the inner member is a fluid conductor (mercury) and the outer member is disposed only at one side instead of entirely around the jar.

Thus, the element sensitive to vertical angular deviations is composed of four fixed inductances shunted by variable capacities placed at right angles to one another, these capacities being gravity operated mercury-filled condensers, as shown in Fig. 2, whose capacities are functions of their angles with respect to the perpendicular. For example in capacity $C_3$, the mercury 13 is level as shown for the vertical position of the instrument and the area of said mercury over plate 14 separated by dielectric D is small and therefore the capacity is small. At this position therefore the resonant frequency of oscillatory circuit $L_3C_3$ is nearly a maximum. Now, if the instrument is tilted to the right slightly, the mercury level in the condenser $C_3$ will remain horizontal and take a different position with respect to the plate and container. Here the area of the mercury 13, opposite plate 14, has been increased and caused a corresponding increase of capacity of $C_3$ and a decrease of resonant frequency of circuit $L_3C_3$.

Thus the resonant frequencies of the four circuits $L_1C_1$, $L_2C_2$, $L_3C_3$, $L_4C_4$, are varied as a function of the degree and direction of inclination of the instrument 1.

All these shunt oscillatory circuits are connected to a common contact point 16 at which point connection is maintained with cable 17 by spring brush 18 (see Fig. 5). A cable 17 conductively connects these oscillatory circuits to a generator F of variable high frequency alternating current located at the surface. This generator which is shown here as a vacuum tube oscillator forms the device by which the angle of the instrument in the hole is detected. The oscillator is of a well known type and comprises a three element thermionic vacuum tube V. T., an inductance $L_5$, a variable capacity $C_5$ to which the indicating dial 20 is attached, fixed capacities C, batteries $B_1$, $B_2$, and an ammeter A. The circuit consisting of $L_5$, $C_5$, A, controls the frequency of the oscillator. By varying capacity $C_5$ the frequency of the oscillator is caused to vary over the desired range of frequencies. The ammeter A serves to indicate the points of adjustment of $C_5$ when frequencies of resonance with circuits in the lowered instrument are reached. Ammeter A may be of an indicating or recording type, and when of the latter type, a record similar to Fig. 7 will be made showing where these points of resonance were reached with respect to dial setting on $C_5$. In operation, instrument 1 is lowered into a bore hole and suspended at any depth at which the degree and direction of inclination is desired. If during the lowering, the instrument case 1 has been caused to rotate, gyroscopic compass G, which has been in operation, will, by controlling orientation motor M, maintain compass frame 2, shaft 3 and oscillatory circuits $L_1$ $L_2$ $L_3$ $L_4$ and $C_1$ $C_2$ $C_3$ $C_4$ in a fixed known horizontal angular position with respect to geographical north. At this point the generator of high frequency alternating current is set into operation and connection is made with the instrument through cable 17, which functions as a voltage power feeder thereto.

The frequency of generator F is then varied slowly over the full range of instrument oscillatory circuit frequencies by variation of capacity $C_5$ (Fig. 5). As the frequency of generator F reaches the resonant frequency of each circuit in the instrument a sudden absorption of energy by the resonant circuit through feeder cable 17 from circuit $L_5C_5$ will be indicated by ammeter A. Thus capacity adjustment of $C_5$ is a measure of the component of the degree of inclination in the plane of each of the four circuits of the inclination-sensitive unit in the instrument 1. Since this unit is maintained in a fixed position relative to geographical north, the said angle indications of $C_5$ can be combined geometrically to give the true degree and direction of inclination.

Fig. 6 shows a set of calibration curves of condenser $C_5$ with dial readings against degree of inclination of each circuit in the instrument. The function of these curves will be understood from the following example. Fig. 7 shows the curve 150 which would be formed by recording the values of the electric impulses as the resonant points of the four sensitive circuits are passed while operating the dial 20 through a complete cycle for any given position of the instrument.

*Example.*—Assume the above operations to have been completed for one position of the instrument in the bore hole and two resonant points indicated by ammeter A at 67.5° and at 202.5°. Referring to calibration curves, Fig. 6, these dial readings are found to correspond to an inclination of 2° in a plane towards the north and 11° in a plane towards the east. These angles can now be combined geometrically to give the true slope and direction of slope of the bore hole. Thus, where A and B are angles of 2° and 11° as above in planes at 90° to one another, $\phi$ the resultant angle is:—

$$\tan\phi = \sqrt{(\tan A)^2 + (\tan B)^2}$$

$$\tan\phi = \sqrt{(\tan 2)^2 + (\tan 11)^2} = \sqrt{.0349^2 + .1944^2}$$

$$\tan\phi = .1975$$

$$\phi = 11° \ 10'$$

The direction of the angle is computed:—

$$\tan\theta = \frac{\tan A}{\tan B}$$

where B is direction referred to $$\tan\theta = \frac{\tan 11}{\tan 2} = \frac{.1944}{.0349} = 5.57$$

$$\theta = 79° \ 49' \text{ east}$$

Thus the angle of the instrument is determined as 11° 10'; and since the instrument has been orientated due north, the inclination is in a plane 79° 49' east of north.

It is to be understood that these disclosures are not to be taken as limiting the broad invention, but merely as illustrative, since many modifications may be made within the scope of the claims by those skilled in the art.

We claim:

1. A method for surveying bore holes comprising introducing into such a hole an electric survey device to a given depth, passing an electric current to said device, and modifying the current successively in accordance with different components of inclination of the device at such depth.

2. A method for surveying bore holes comprising lowering to a given depth an instrument containing electrical devices sensitive to variations from the vertical, generating an electric wave in said devices, modifying the wave in accordance with a component of inclination of the devices, and further modifying the wave to indicate another component of inclination of the devices.

3. A method for surveying bore holes comprising lowering an instrument containing devices sensitive to departures from the vertical, generating an electric current in said devices, and producing a group of modifications successively in said current indicative of various components of the inclination of the instrument at any given position, and orienting the instrument.

4. A method for surveying bore holes comprising lowering an instrument containing devices sensitive to departures from the vertical, generating an electric current, and successively modifying said current a plurality of times through the respective actions of a plurality of said devices as indications of different components of inclination at any given position.

5. A method for surveying bore holes comprising lowering an instrument containing resonant electrical circuits therein each responsive to a component of the inclination of the instrument, changing the resonant frequency characteristics of said electrical circuits in proportion to the components of inclination of said instrument, determining said changed frequency characteristics by applying thereto a variable high frequency current, and deriving said inclination therefrom.

6. A method for surveying bore holes comprising lowering an instrument containing mechanically oriented electrical circuits, changing the frequency characteristics of said electrical circuits in proportion to the inclination of said instrument, and measuring said frequency characteristics to determine the inclination of said instrument and the direction of such inclination.

7. A method according to claim 6 including maintaining separated distinguishing frequency ranges in the various circuits.

8. An apparatus for surveying bore holes comprising an instrument adapted to be lowered into a bore hole, said instrument comprising a plurality of electrical devices sensitive to changes in position of the instrument, and means connected with said instrument for passing an electric wave through each of said devices, said devices being adapted to deform said wave successively in its passage in accordance with different components of inclination of said instrument.

9. A well survey apparatus comprising means for generating an electric impulse in the form of a wave, and an instrument adapted to be lowered into a well bore, said instrument comprising a plurality of resonant devices having separated frequency ranges and adapted to receive a wave, and means associated with said devices to deform such a wave in accordance with inclination of the instrument.

10. A structure according to claim 9 in combination with means to maintain orientation of the instrument.

11. A well survey apparatus comprising means for generating an electric impulse in the form of a wave, and an instrument adapted to be lowered into a well bore, said instrument comprising resonance means to deform the wave in accordance with a component of inclination and resonance means having separated frequency ranges to deform said wave further for determination of the direction of inclination at said depth, said means acting successively to deform said wave.

12. A well survey instrument comprising an instrument adapted to be lowered into a well, a condenser disposed in said instrument and sensitive to deviations from the vertical to modify an electric impulse in accordance with one component of inclination, and cooperating means including another condenser in said instrument sensitive to deviations from the vertical to modify an electric impulse according to another component of inclination for determination of the inclination of the instrument.

13. A structure according to claim 12 wherein the dielectric of the gravity condenser is a jar and the gravity-operated member of such condenser is a fluid conducting body.

14. A structure according to claim 12 wherein the condensers are modified Leyden jars containing mercury as the inner members, the outer member of each jar covering only a portion of the sides thereof.

15. A well survey device comprising an instrument adapted to be lowered into a well, means to maintain orientation of said instrument, said instrument containing a series of electric devices arranged about the axis of the instrument and having variable capacities, said devices being sensitive to deviations from the vertical, and means to detect variations in electric impulses passed to said devices.

16. A well survey device comprising an instrument adapted to be lowered into a well, means to orient said instrument, said instrument containing a plurality of variable capacities radially arranged about the axis of the instrument, said capacities being separately sensitive to deviations from the vertical, and means to detect respective variations in said capacities caused by their deviation from the vertical for any given position and to indicate the value of such variations.

17. A structure according to claim 15 wherein each capacity comprises a condenser whose dielectric is in the form of a narrow jar extending longitudinally of the axis of the instrument and projecting radially therefrom, each jar containing a mercury body and each jar having a stationary conductor element on its outermost faces only.

18. A well survey apparatus comprising means for generating an electric impulse in the form of a wave, an instrument adapted to be lowered into a well bore, and means connecting the generating means to the instrument, the instrument comprising means to deform the wave in accordance with one component of inclination at a given depth and means to deform said wave further in accordance with another component of inclination at said depth.

19. An instrument according to claim 18 including means for orienting the instrument.

20. In a well survey instrument having a vertical axis, a plurality of condensers disposed about the axis of the instrument, a fluid conducting body in each condenser, and means in each condenser cooperating with the fluid body and adapted for contact with the fluid body for modifying the condenser capacity upon inclination of the instrument.

21. A structure according to claim 20 wherein the cooperating means in each condenser comprise plates inclined at different angles in the different condensers for variation of the relationship in the various condensers.

LYLE DILLON.
ROBT. W. PHELPS.